United States Patent [19]
Moon

[11] Patent Number: 5,986,990
[45] Date of Patent: Nov. 16, 1999

[54] DEVICE FOR DETECTING DIGITAL BIT IN OPTICAL DISC REPRODUCING APPARATUS

[75] Inventor: Byeong Moo Moon, Seoul, Rep. of Korea

[73] Assignee: LG Electronics Inc., Seoul, Rep. of Korea

[21] Appl. No.: 08/927,091

[22] Filed: Sep. 10, 1997

[30] Foreign Application Priority Data

Sep. 10, 1996 [KR] Rep. of Korea ........... 96-39047

[51] Int. Cl.⁶ ........................................... G11B 7/00
[52] U.S. Cl. ................................. 369/59; 369/124
[58] Field of Search ......................... 369/59, 124, 47, 369/48; 360/51

[56] References Cited

U.S. PATENT DOCUMENTS

| | | | |
|---|---|---|---|
| 5,440,532 | 8/1995 | Yokogawa et al. | 369/48 |
| 5,680,380 | 10/1997 | Taguchi et al. | 369/48 |
| 5,745,464 | 4/1998 | Pagueli et al. | 369/59 |
| 5,764,608 | 6/1998 | Satomura | 369/59 |
| 5,812,508 | 9/1998 | Moon | 369/124 |

Primary Examiner—Thang V. Tran

[57] ABSTRACT

A device for detecting a digital bit in an optical disc reproducing apparatus, where the optical disc reproducing apparatus has an optical pick-up for picking up an RF signal from information pits formed in the optical disc, and where the device includes first bit detecting means for detecting bit data from the RF signal, compensating value generating means for selectively generating a certain compensating value according to the state of arrangement of the bit data detected in the first bit detecting means, and amplitude adjusting means for adjusting an amplitude of the RF signal within a certain section thereof according to the certain compensating value generated in the compensating value generating means.

26 Claims, 5 Drawing Sheets

RF signal →
bit data →

DEVICE FOR DETECTING DIGITAL BIT IN OPTICAL DISC REPRODUCING APPARATUS

BACKGROUND OF THE INVENTION

1. Field of the Invention

The present invention relates to an optical disc reproducing apparatus, and more particularly, to a device for detecting a digital bit in an optical disc reproducing apparatus, which can minimize occurrence of errors in reproducing a digital bit from a radio frequency(RF) signal received at the optical disc reproducing apparatus.

2. Discussion of the Related Art

A general optical disc, such as a compact disc, digital audio disc and digital video disc, stores digital bit data of "1" or "0" in forms of pits which vary a reflection ratio or a refractive index of a light beam. These pits, formed by a light beam of relatively high energy, compose tracks on an information recording surface of the optical disc. In order to prevent the light beam from being off the track due to excessive direct current component generated during a reproduction, the digital bit data is formatted such that logical values of "1" or "0" are not in succession more than a certain times, for example, in the case of 8–14 modulated data, no more than 3 to 11 times so that the RF signal picked up from the optical disc by an optical pick-up is always within a specified range of width. The specified range of width herein is 3T to 11T.

In the meantime, the optical disc can not be formed to have a uniform plane, but is formed to have a slight asymmetrical plane due to a mechanical tolerance. And, spots of a light beam directed onto a surface of the optical disc can not be made always to have a fixed size and form due to a mechanical tolerance of the optical pick-up, too. Because of these reasons, the width of the RF signal picked up from the optical disc by the optical pick-up either exceeds or falls short of the specified range to occur an error in a digital bit.

However, it is a current trend to form the pits as closer as possible on the optical disc for recording a larger amount of data. But this high concentration of pits causes interferences between the pits, accelerating the problem of noise component occurrence in the RF signal and acting as a cause increasing an error occurrence rate in a digital bit data. In order to minimize such error occurrence in the digital bit data, a digital bit data reproducing device employs a method in which the RF signals are adaptively interpolated according to a transmission rate of the RF signal. However, because of the asymmetry of the optical disc and the focusing errors of the light beam, this adaptive interpolation method could not have been possible to correct distortions of the RF signals coming from the interference, though it could have been possible to remove relatively small noise components. Because of this, the digital bit reproducing device for an optical disc has a problem in that an amount of error in the digital bit data can not be reduced below a certain limit.

In order to solve the aforementioned problems, the same applicant has applied the Korean Patent No.95-55629 related to a device for reproducing a digital bit in an optical disc reproducing apparatus, which will be explained briefly, hereinafter.

In the device for reproducing a digital bit in an optical disc reproducing apparatus by the applicant, a RF signal reproduced from an optical pick-up is converted into a digital RF data, subjected to adaptive interpolation according to a transmission rate, and corrected of an asymmetry error of the optical disc. The RF data having corrected of the asymmetry error is taken of its absolute value to restore the digital bit. In this RF data adaptive interpolation method, a clock signal corresponding to the transmission rate of the RF data is generated using a digital synchronous loop, and a logical value of the RF signal is adjusted at fixed phases of the clock signal. This adaptive interpolation method makes interpolation of the RF data bit by bit, allowing removal of a momentary excessive noise, i.e., a noise component coming from a focusing error of the light beam, but not allowing the correction of a RF data distortion coming from interferences between pits; a width of the RF signal that falls short of the specified range can not be corrected to be within the specified range and the asymmetry correction to be within the specified range is also not possible though removal of the momentary noise component coming from a tilting of the optical disc is possible. Because of this, the conventional digital bit reproducing device in an optical disc reproducing apparatus has a problem in that occurrence of errors in a digital bit data can not be reduced below a certain limit because the correction of the distortion of the RF signal coming from interferences between pits in the optical disc is not possible.

SUMMARY OF THE INVENTION

Accordingly, the present invention is directed to a device for detecting a digital bit in an optical disc reproducing apparatus that substantially obviates one or more of the problems due to limitations and disadvantages of the related art.

An object of the present invention is to provide a device for detecting a digital bit in an optical disc reproducing apparatus, which can make an exact compensation for a distortion of a RF signal coming from interferences between pits in a high density optical disc, to minimize occurrence of errors during a reproduction of a digital bit data.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for detecting a digital bit in an optical disc reproducing apparatus, the optical disc reproducing apparatus having an optical pick-up for picking up a RF(Radio Frequency) signal from information pits formed in the optical disc, includes first bit detecting means for detecting bit data from the RF signal, RF signal compensating means for partial compensation of the RF signal according to a state of arrangement of the bit data detected in the first bit detecting means, and second bit detecting means for detecting bit data from the RF signal compensated in the RF signal compensating means.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiment of the present invention, examples of which are illustrated in the accompanying drawings.

Figure 1:
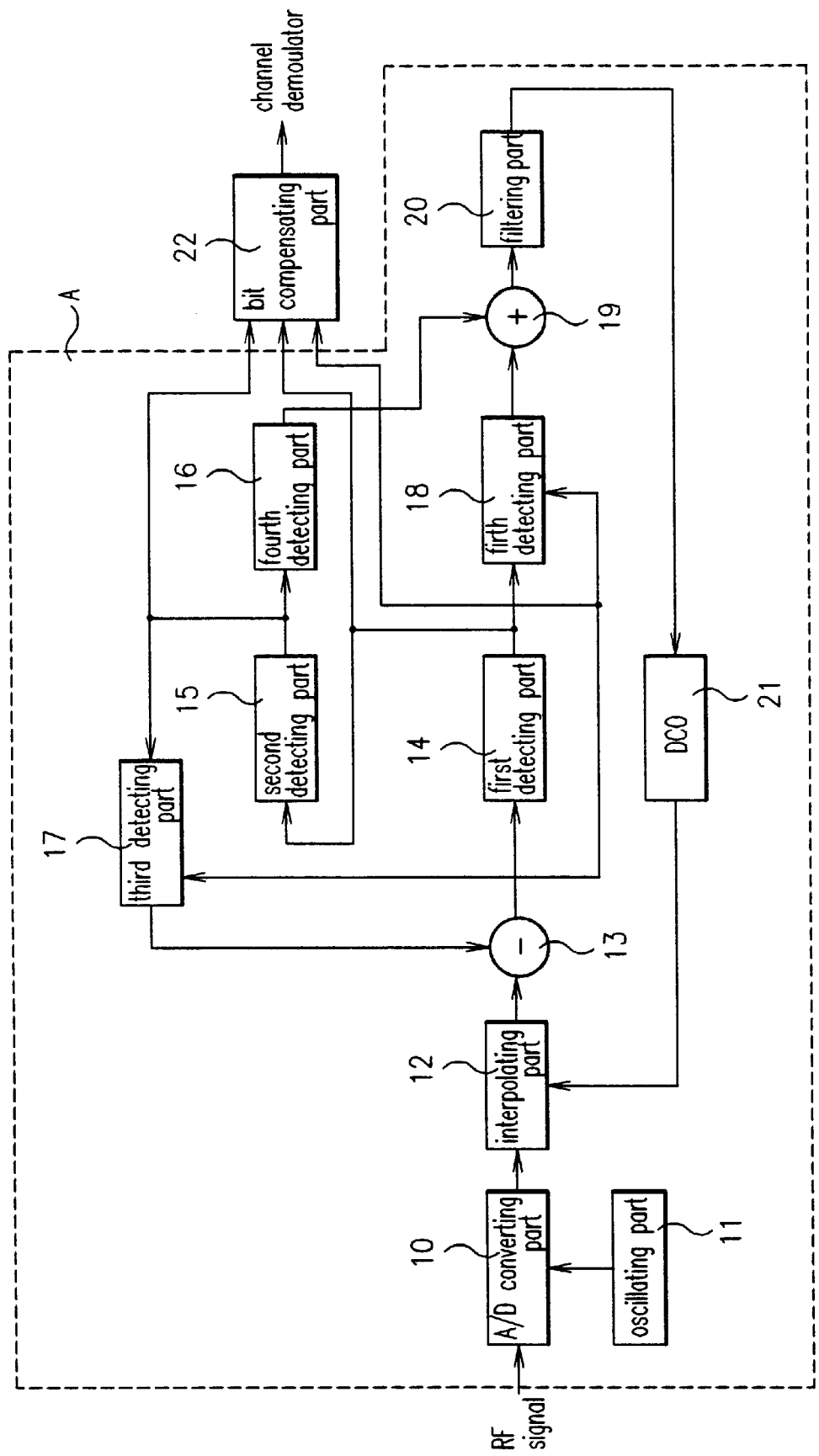
FIG. 1 illustrates a block diagram showing a device for detecting a digital bit in an optical disc reproducing apparatus in accordance with a preferred embodiment of the present invention.

FIG. 1 illustrates a block diagram showing a device for detecting a digital bit in an optical disc reproducing apparatus in accordance with a preferred embodiment of the present invention. Referring to FIG. 1, the device for detecting a digital bit in an optical disc reproducing apparatus includes, at large, a bit data reproducing part "A" for converting a RF analog signal received from an optical disc into a digital signal corresponding pits in the optical disc and a bit compensating part 22 for compensating an influence coming from intercodal interference in the reproduced bit data. The bit data reproducing part "A" includes an A/D (analog to digital) converting part 10 for digitizing a RF signal(RF data) provided by an optical pick-up (notshown) according to clock pulses provided from an oscillating part 11, an interpolating part 12 for receiving the RF data digitized in, and provided from the A/D converting part 10 and making interpolation of the RF data at every cycle of a provided bit clock signal, a subtracting part 13 for receiving the RF data interpolated in the interpolating part 12 and subtracting an asymmetry error provided from the RF data to produce a RF corrected data, a first detecting part 14 for receiving the RF corrected data from the subtracting part 13 and determining the RF corrected data of being "1" or "0" to detect a bit stream of "1" or "0", a second detecting part 15 for receiving the bit stream detected in the first detecting part 14 and detecting a length of bit data of the "1" or "0" repeated in succession, a fourth detecting part 16 for detecting a transmission rate of the RF data from the bit data detected in the second detecting part 15 and a frequency corrected data corrected of a frequency error from the transmission rate, a third detecting part 17 for receiving the length of bit data detected in the second detecting part 15 and the RF corrected data provided from the subtracting part 13 to detect the asymmetry error in the optical disc and provide the detected asymmetry error to the subtracting part 13, a fifth detecting part. 18 for receiving the bit stream provided from the first detecting part 14, detecting a phase of the bit stream, and detecting a difference of the detected phase of the bit stream and a phase of the RF corrected data provided from the subtracting part 13, an adding part 19 for receiving the phase difference detected in the fifth detecting part 18 and adding the frequency corrected data detected in the fourth detecting part 16, to produce a synchronization correcting value for correcting the phase difference, a filtering part 20 for receiving the synchronization correcting value provided from the adding part 19 and subjecting the synchronization correcting value to low pass filtering, and a DCO(Digital Controlled Oscillator) 21 for summing the synchronization correcting values filtered in the filtering part 20 to produce a bit clock signal synchronous with the RF signal and provide the bit clock signal to the interpolating part 12, thereby a bit data is reproduced.

The operation of the aforementioned device for detecting a digital bit in an optical disc reproducing apparatus will be explained.

Figure 2:
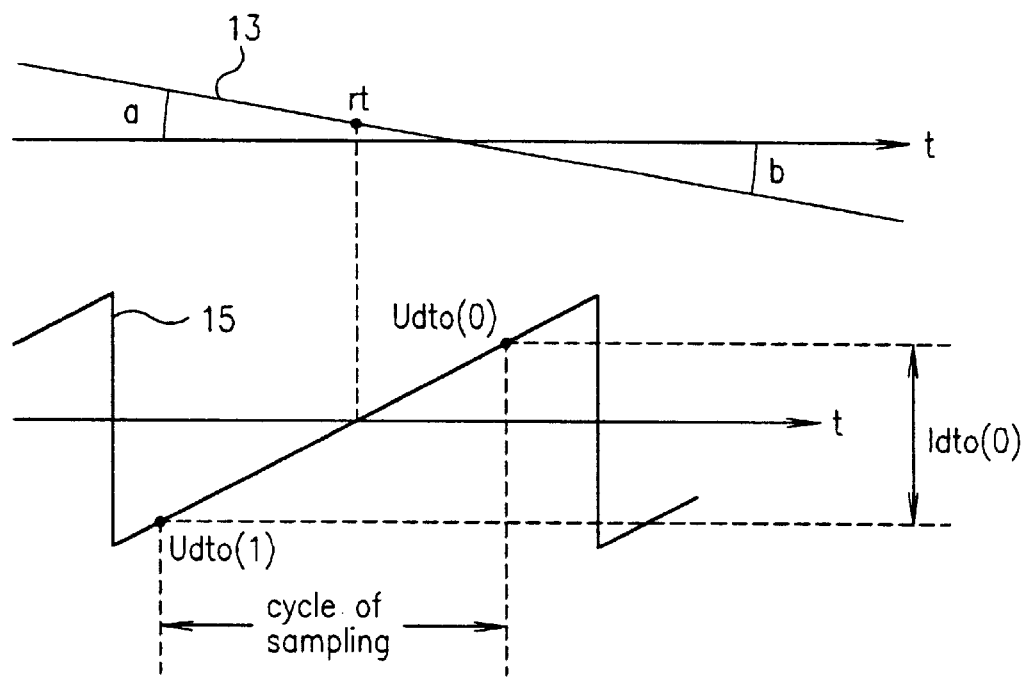
FIG. 2 illustrates a detailed system of the interpolating part shown in FIG. 1.

The RF signal produced by the optical pick-up is provided to the A/D converting part 10. The RF signal contains information read in from the optical disc. The A/D converting part 10 samples the RF signal received every time the clock pulses are applied thereto from the oscillating part 11, digitizes, and provides to the interpolating part 12. The digitized RF signal is interpolated in the interpolating part 12 at every cycle of the bit clock signal provided from the DCO 21. That is, referring to FIG. 2, every time a phase of the bit clock signal provided from the DCO 21 is "0", a logical value of the RF data is adjusted to produce an interpolated RF data. The RF interpolated data can be calculated by detecting maximum and minimum values and an amplitude of the RF data, and a minimum value and an amplitude of the bit clock signal, for a certain period, and subjecting these detected values to calculation according to an equation shown below.

$$RF = a + (a - b) * Udto1 / Idto, \qquad (1)$$

where, "a" denotes the maximum value of the RF data, "b" denotes the minimum value of the RF data, Udtol is the minimum value of the bit clock signal, and Idto is an amplitude of the bit clock signal.

The RF data interpolated in the interpolating part 12 is provided to the subtracting part 13. The subtracting part 13 subtracts the asymmetry error in the optical disc detected in the third detecting part 17 from the interpolated RF data provided from the interpolating part 12 to remove a noise component caused by the asymmetry of the optical disc from the RF data. Accordingly, the subtracting part 13 produces the RF corrected data having the noise component removed therefrom and provides the same to the third detecting part 17, the first detecting part 14 and the fifth detecting part 18. The first detecting part 14 takes an absolute value of the RF corrected data provided from the subtracting part 13 to produce a bit stream which is provided both to the second detecting part 15 and the fifth detecting part 18. The second detecting part 15 counts a number of successively repeated "1" or "0" in the bit stream provided from the first detecting part 14, i.e., a number of successive bit data, to detect a length of bit data of the counted "1" or "0" and provide the length to the third and fourth detecting part 17 and 16. According to the length of the successive bit data provided thus, the fourth detecting part 16 detects a transmission rate of the RF data and detects a frequency correcting data for a frequency error according to the detected transmission rate. That is, when the length of the successive "1" or "0" in the bit data is "1" or "2" which is shorter than a specified minimum length, the fourth detecting part 16, determining that the RF data is transmitted at a transmission rate faster than the specified transmission rate, produces the frequency correcting data for raising a frequency of the bit clock signal. The minimum successive length of the bit data of "1" or "0" in the bit stream is specified to be 3 for CD and DVD. Different from this, when the length of the successive "1" or "0" in the bit data is longer than a specified maximum length, the fourth detecting part 16, determining that the RF data is transmitted at a transmission rate slower than the specified transmission rate, produces the frequency correcting data for dropping a frequency of the bit clock signal. The maximum successive length of the bit data of "1" or "0" in the bit stream is specified to be 11 for CD, and 14 for DVD.

Figure 3:
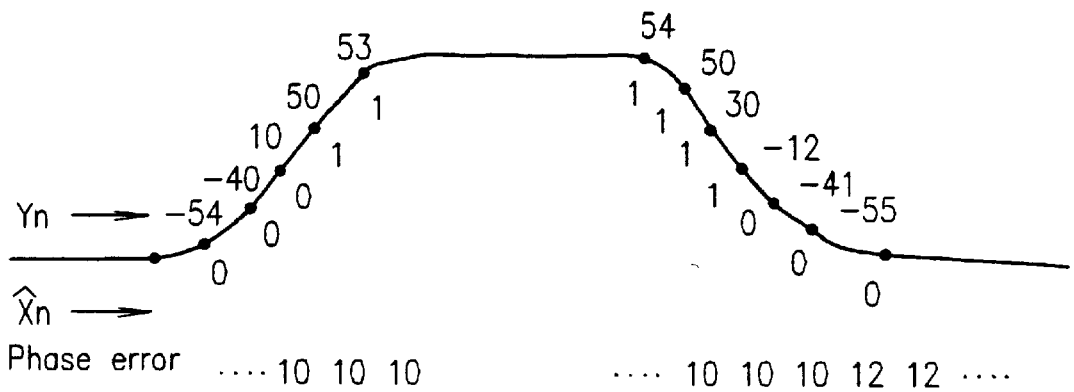
FIG. 3 illustrates a waveform of a RF corrected data for explaining operation of the phase detector shown in FIG. 1.

In the meantime, the third detecting part 17 detects the asymmetry error caused by asymmetry of the optical disc by using the length of a successive bit data provided from the second detecting part 15 and the RF corrected data provided from the subtracting part 13, and provides the detected asymmetry error to the subtracting part 13. In conclusion, the subtracting part 13, the first detecting part 14, the second detecting part 15 and the third detecting part 17 conduct a function for compensating the noise component and distortion caused by the asymmetry of the optical disc contained in the RF data. And, the fifth detecting part 18 compares the phase of the bit stream provided from the first detecting part 14 to detect a phase difference between the bit clock signal and the RF corrected data provided from the subtracting part 13. That is, as shown in FIG. 3, the fifth detecting part 18 samples a logical value of the RF corrected data at every bit of the bit stream provided from the first detecting part 14 and compares the sampled logical value to a median of a sampled value from an adjacent bit, to detect the phase difference between the RF corrected data and the bit clock signal. The phase difference detected thus is provided to the adding part 19. In FIG. 3, Yn denotes a logical value of the RF corrected data, and Xn denotes a bit data. The adding part 19 adds the frequency correcting value provided from the fourth detecting part 16 to the phase difference, i.e., a phase error provided from the fifth detecting part 18 to produce and provide a synchronization correcting value for correcting a frequency difference and a phase difference between the RF data and the bit clock signal to the filtering part 20. The filtering part 20 subjects the synchronization correcting value from the adding part 19 to low pass filtering to moderate rapid fluctuation of the synchronization value. As a result, the phase and frequency of the bit clock signal gradually converges to target values. The synchronization correcting value is transferred from the filtering part 20 to the DCO 21 and accumulated therein to generate the bit clock signal synchronous to the RF signal, which is then fed back to the interpolating part 12 In this instance, according to the bit clock signal fed back to the interpolating part 12, a time point at which the interpolating part 12 is to make an interpolation, and a data required for the interpolation is provided. At the end, the first, second, fourth and fifth detecting parts 14, 15, 16 and 18, the adding part 19, the filtering part 20 and the DCO 21 together constitutes a DPLL(Digital Phase Locked Loop) which provides the bit clock signal synchronized to the RF signal.

The bit data reproduced thus has its distortion caused by the asymmetry compensated. Since this bit data still contains the influence from the interferences between codes, the bit compensating part 22 in FIG. 1 is provided for reducing the influence from noise caused by the interferences between the codes in the bit data reproduced thus. The bit compensating part 22 receives the length of a successive bit data in the bit stream, the bit stream detected in the first detecting part 14 and the RF corrected data from the subtracting part 13, and determines that there is an error in case the length of the successive data is shorter than 3 and compensates a level of the RF signal having the asymmetry compensated. Accordingly, components of the noise from the interferences and the distortion contained in the RF corrected data are removed. And, the bit compensating part 22 detects a bit stream of "0" or "1" from the RF signal having the level compensated thus. The reproduced digital bit data is provided to a channel demodulator (not shown).

Figure 4:
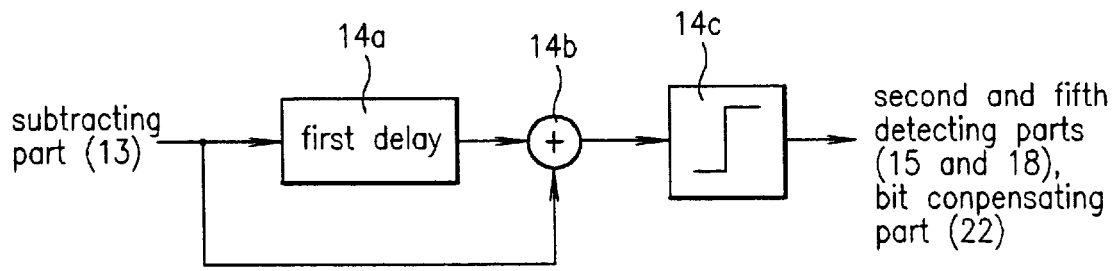
FIG. 4 illustrates a detailed system of the first detecting part shown in FIG. 1.

FIG. 4 illustrates a detailed system of the first detecting part shown in FIG. 1, including a first delay 14a, an adder 14b and an absolute value calculator 14c. The delay 14a connected to an output terminal on the subtracting part 13 for delaying the RF corrected data received from the subtracting part 13 for one cycle of the bit clock signal and providing to the adder 14b. The adder 14b receives the delayed RF corrected data provided from the delay 14a and adds the delayed RF corrected data and the RF corrected data provided from the subtracting part 13 to remove a noise of high frequency component contained in the RF corrected data. Thus, the delay 14a and the adder 14b constitutes a digital low pass filter for low pass filtering the RF corrected data provided from the subtracting part 13. The absolute value calculator 14c compares a logical value of the low pass filtered RF corrected data provided from the adder 14c to a preset reference value to produced a bit data of logical values of "1" or "0". That is, if the low pass filtered RF corrected data provided from the adder 14c is smaller than "0", the absolute value calculator 14 produces a bit data of a logical value of "0". And, if the low pass filtered RF corrected data provided from the adder 14c is greater than "1", the absolute value calculator 14 produces a bit data of a logical value of "1". The bit data thus produced is provided to the second detecting part 15, the fifth detecting part 18 and the bit compensating part 22 shown in FIG. 1, respectively.

The explanations on the operation of the second detecting part 15, the fifth detecting part and the bit compensating part 22, which have been explained, will be omitted.

Figure 5:
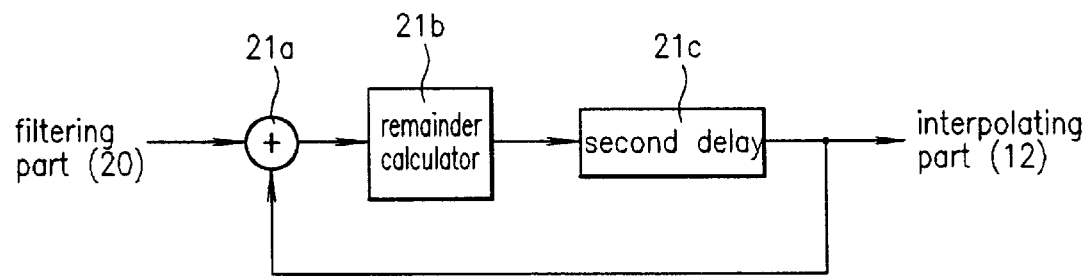
FIG. 5 illustrates a detailed system of the DCO shown in FIG. 1.
Figure 6:
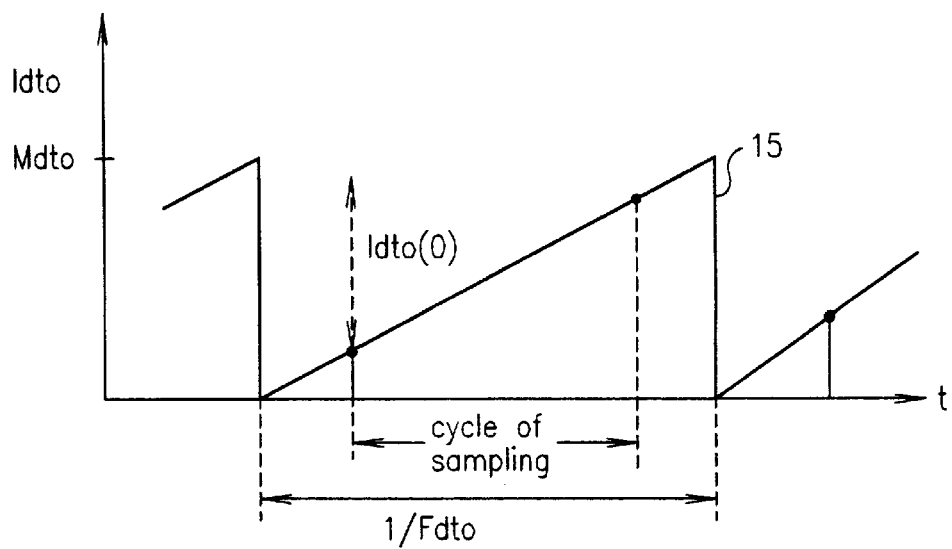
FIG. 6 illustrates a waveform from the delay shown in FIG. 5.

FIG. 5 illustrates a detailed system of the DCO shown in FIG. 1, including an adder 21a, a remainder calculator 21b and a delay 21c. The adder 21a, connected to the filtering part 20 shown in FIG. 1, adds the filtered synchronization correcting value provided from the filtering part 20 to the bit clock signal delayed for certain bits fed back from the delay 21c and provides to the remainder calculator 21b. The remainder calculator 21b divides an added data provided from the adder 21a with a certain divisor, i.e., with an amplitude Idto to produce a remainder. The delay 21c delays the remainder provided from the remainder calculator 21b for a certain time period, feeds the delayed remainder back to the adder 21a as the bit clock signal and, on the same time, provides to the interpolating part 12 shown in FIG. 1. The bit clock signal thus provided in the delay 21c has a waveform shown in FIG. 6. FIG. 6 illustrates a waveform from the delay shown in FIG. 5, showing slopes(frequency and phase) varied with the synchronization correcting value Idto, where the Mdto denotes a maximum value of the bit clock signal, Ts denotes a sampling period of the interpolating part 12, and the 1/Fdto denotes a cycle of the bit clock signal.

Figure 7:
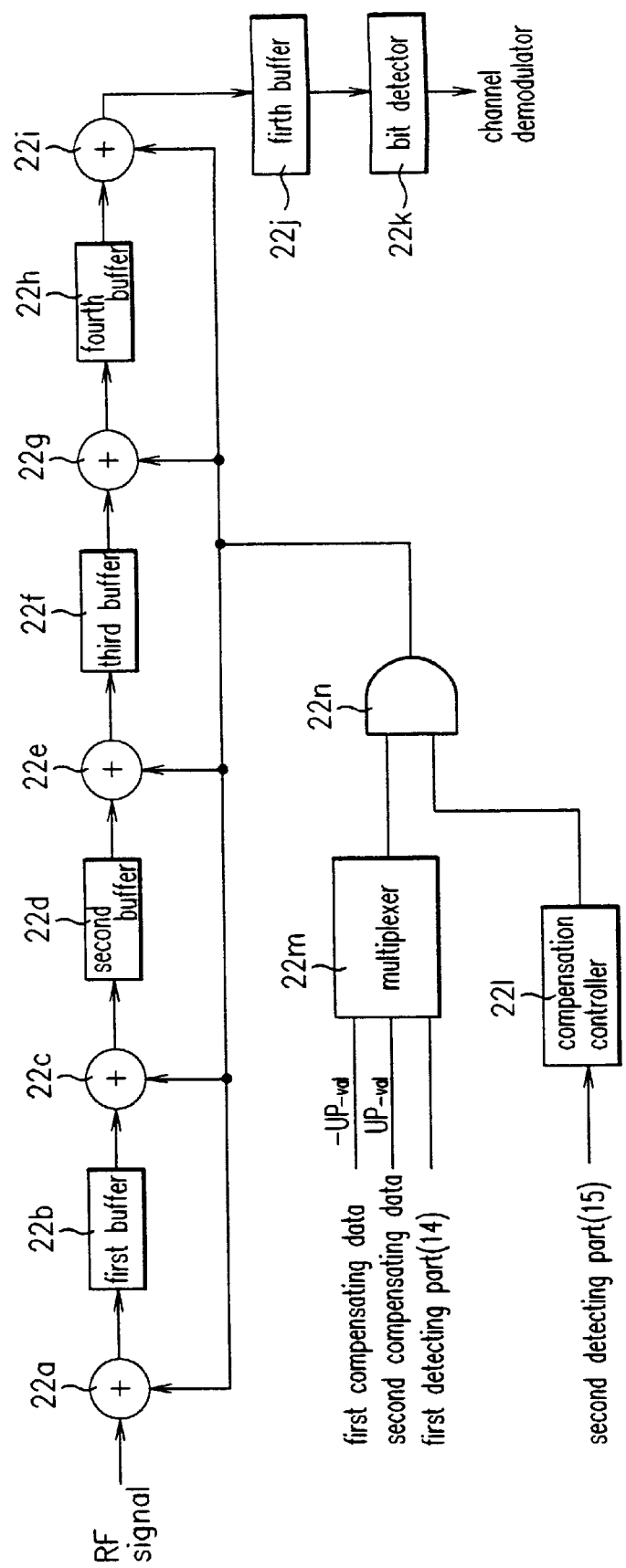
FIG. 7 illustrates a detailed system of the bit compensating part shown in FIG. 1; and, FIGS. 8a and 8b respectively illustrate waveforms of a RF corrected data and a compensated RF corrected data.

FIG. 7 illustrates a detailed system of the bit compensating part shown in FIG. 1, including first, second, third, fourth and fifth adders 22b, 22d, 22f, 22h and 22i, a bit detector 22k, a compensation controller 22l, a multiplexer 22m, and an AND gate 22n. The multiplexer 22m selectively provides either one of the first, and second compensating data-UP-val and UP-val to the AND gate 22*n* depending on the logical value of the bit data provided from the first detecting part 14 shown FIG. 1, the first compensating data-UP-val being a negative logical value and the second compensating data UP-val being a positive logical value. For example, if the bit data provided from the first detecting part 14 is "1", the multiplexer 22*m* selects and provides the first compensating data -UP-val to the AND gate 22*n*, and if the bit data provided from the first detecting part 14 is "0", the multiplexer 22*m* selects and provides the second compensating data UP-val to the AND gate 22*n*. The AND gate 22*n* conducts a controlling switch function for switching the compensating data provided from the multiplexer 22*m* depending on a high/low level of a compensation controlling pulse of a preset logic provided from the compensation controller 221. In this instance, the compensation controller 221 determines the length of the successive bit data detected in the second detecting part shown in FIG. 1 of being shorter than "3" and produces the compensation controlling pulses of a preset logic according to the result, to control the switching operation of the AND gate 22*n*. That is, the compensation controller 221 produces and provides a high level compensation controlling pulse to the AND gate 22*n* if the length of the successive bit data detected in the second detecting part 15 is either "1" or "2". Then, the AND gate 22*n* provides the compensating data selected in and provided from the multiplexer 22*m* to the first, second, third, fourth and fifth adders 22*a*, 22*c*, 22*e*, 22*g* and 22*i* respectively according to a logical signal of the high level compensation controlling pulse provided from the compensation controller 221. On the other hand, if the length of the successive bit data detected in the second detecting part shown in FIG. 1 is longer than "3", the compensation controller 221 produces and provides a low level logical signal to the AND gate 22*n*. Accordingly, the AND gate 22*n* blocks output of the compensating data selected in, and provide from the multiplexer 22*m*. The length of "3" is the minimum of the length of the successive bit data specified in a CD or DVD.

Figure 8A:
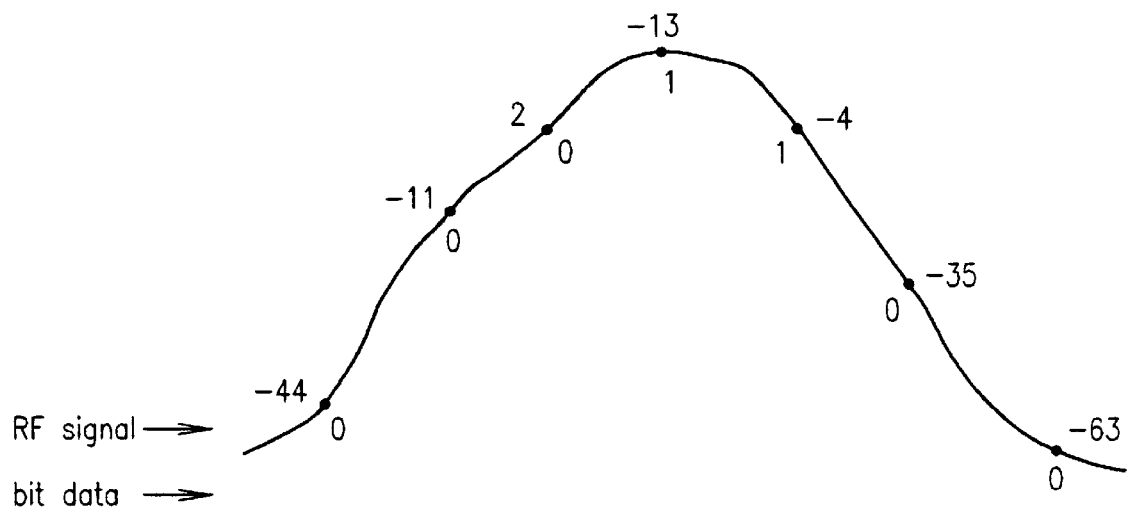
Figure 8B:
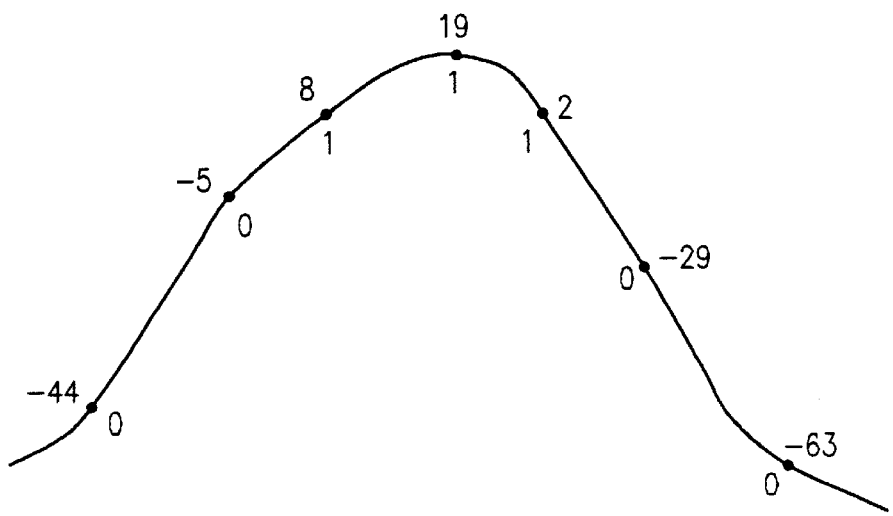

The compensating data thus provided from the AND gate 22*n* to the first, second, third, fourth and fifth adders 22*a*, 22*c*, 22*e*, 22*g* and 22*i* respectively is added to the RF corrected data provided from the subtracting part 13 shown in FIG. 1 respectively to remove the noise component and the distortion component contained in the RF corrected data caused by interferences, thereby compensating the RF corrected data. In detail, the first adder 22*a* adds the "0" provided from the AND gate 22*n* and the first, and second compensating data -UP-val and UP-val to the RF corrected data provided from the subtracting part 13 shown in FIG. 1 to remove the noise and distortion components from the RF corrected data provided from the subtracting part 13, thereby compensating the RF corrected data. The RF corrected data thus compensated is temporarily stored in a first buffer 1. The second adder 22*c* adds the "0" provided from the AND gate 22*n* and either the first, or second compensating data -UP-val or UP-val to the RF corrected data temporarily stored in, and provided from the first buffer 22*b*, to remove the noise component and the distortion component contained in the RF data caused by interferences to have the RF data compensated. Then, this compensated RF corrected data is temporarily stored in a second buffer 22*c*. Alike the aforementioned operation of the first, and second adders 22*a* and 22*c*, each of the third to fifth adders 22*e*, 22*g* and 22*i* adds the "0" provided from the AND gate 22*n* and either the first, or second compensating data -UP-val or UP-val to the RF corrected data temporarily stored in, and provided from respective buffer of the second to fourth buffers 22*d*, 22*f* and 22*h* to have the RF data compensated. The RF corrected data thus compensated is temporarily stored in respective buffer of the third to fifth buffers 22*f*, 22*h* and 22*j*. In the case when the length of successive bit data is either "1" or "2", the first to fifth adders 22*a*, 22*c*, 22*e*, 22*g* and 22*i* cause the first to fifth buffers 22*b*, 22*d*, 22*f*, 22*h* and 22*j* to store the RF corrected data as shown in FIG. 8*a* which are the RF corrected data as shown in FIG. 8*a* having the first or second compensating data -UP-val or UP-val added thereto, respectively and simultaneously. The bit compensating part 22 shown in FIG. 1 constitutes a bit detector 22*k* shown in FIG. 7 which receives the RF corrected data from the fifth buffer 22*j*. The bit detector 22*k* compares the logical value of the RF corrected data to a preset reference value to take an absolute value, utilizing which the bit stream is produced. In detail, the bit detector 22*k* produces a digital bit data of "0" logical value in case the logical value of the RF corrected data is smaller than the preset reference value. Opposite to this, the bit detector 22*k* produces a digital bit data of "1" logical value in case the logical value of the RF corrected data is greater than the preset reference value. To this purpose, the bit detector 22*k* is devised to have a system as shown in FIG. 4. And, as shown in FIG. 8*b*, the bit stream of the digital bit data produced from the bit detector 22*k* becomes to contain accurate bit data successive for at least 3 or more of "1" or "0" logical values.

As has been explained, the device for detecting a digital bit in an optical disc reproducing apparatus of the present invention detects a bit data from a RF signal primarily and partially compensate the RF signal according to a length of succession of the primary bit data, whereby allowing removal of a noise component and distortion component caused by interferences between pits.

And, the device for detecting a digital bit in an optical disc reproducing apparatus of the present invention detects a digital bit data from a partially compensated RF signal, whereby minimizing occurrence of error data.

Moreover, the device for detecting a digital bit in an optical disc reproducing apparatus of the present invention adaptively interpolates the RF signal to remove a noise component coming from defocusing of an light beam as well as to correct the RF signal of the asymmetry error.

Accordingly, the device for detecting a digital bit in an optical disc reproducing apparatus of the present invention has an advantage that an accurate detection of a digital bit data from the RF signal is made possible.

It will be apparent to those skilled in the art that various modifications and variations can be made in the device for detecting a digital bit in an optical disc reproducing apparatus of the present invention without departing from the spirit or scope of the invention. Thus, it is intended that the present invention cover the modifications and variations of this invention provided they come within the scope of the appended claims and their equivalents.

What is claimed is:

1. A device for detecting a digital bit in an optical disc reproducing apparatus, the optical disc reproducing apparatus having an optical pick-up for picking up a radio frequency signal from information pits formed in the optical disc, the device comprising:

first bit detecting means for detecting bit data from the radio frequency signal;

compensating value generating means for selectively generating a predetermined compensating value according an arrangement state of the bit data detected by the first bit detecting means; and amplitude adjusting means for adjusting an amplitude of the radio frequency signal within a section thereof according to the predetermined compensating value generated in the compensating value generating means.

2. A device as claimed in claim 1, wherein the first bit detecting means further includes an asymmetry correcting means for detecting an asymmetry from the radio frequency signal and for compensating the signal according to a value of the detected asymmetry.

3. A device as claimed in claim 2, wherein the asymmetry correcting means includes, an asymmetry detector for detecting an asymmetry from the RF signal, and an operator for subjecting a value of the detected asymmetry to subtraction from, or addition to the RF signal.

4. A device as claimed in claim 1, wherein the compensating value generating means includes, a compensating value generator for generating the certain compensating value, switching means for switching the certain compensating value generated in the compensating value generator, and switching controlling means for controlling the switching means according to the state of arrangement of the bit data detected in the first bit detecting means.

5. A device as claimed in claim 4, wherein the switching controlling means includes, run length detecting means for counting a number of successive repetition of the bit data detected in the first bit detecting means, and compensation controlling means for comparing a length of succession of the bit data counted in the run length detecting means to a preset reference length and controlling the switching means according to a result of the comparison.

6. A device as claimed in claim 5, wherein the switching means is controlled according to a result of the comparison if the run length determinate shorter than 2T.

7. A device as claimed in claim 4, wherein the certain compensating value may be either positive or negative.

8. A device as claimed in claim 1, further comprising compensating value selecting means for selectively providing either one of the positive or negative compensating value generated in the compensating value generating means according to a logical value of the bit data detected in the first bit detecting means.

9. A device as claimed in claim 1, wherein the amplitude adjusting means includes, a plurality of delays connected between the optical pick-up and the second bit detecting means for delaying the RF signal within a certain section thereof generated in the optical pick-up, and a plurality of adders added to the delays for adding the compensating value to the RF signal.

10. A device as claimed in claim 9, wherein the plurality of delays are adapted to delay as much as for five bit data duration.

11. A device as claimed in claim 1, wherein the first bit detecting means includes interpolating means for making an adaptive interpolation of the RF signal according to a transmission rate of the bit data detected in the first bit detecting means.

12. A device as claimed in claim 1, wherein the means for compensating the bit data includes, RF signal compensating means for partial compensation of the RF signal according to a state of arrangement of the bit data detected in the first bit detecting means, and second bit detecting means for detecting bit data from the RF signal compensated in the RF signal compensating means.

13. A device for detecting a digital bit in an optical disc reproducing apparatus, the optical disc reproducing apparatus having an optical pick-up for picking up a radio frequency signal from information pits formed in the optical disc, the device comprising:

first bit detecting means for detecting bit data from the radio frequency signal; and means for compensating the bit data according to an arrangement state of the bit data detected by the first bit detecting means, wherein the first bit detecting means includes interpolating means for making an adaptive interpolation of the radio frequency signal according to a transmission rate of the bit data detected in the first bit detecting means, wherein the interpolating means includes:

a phase difference detecting part for detecting a phase difference between the bit data detected in the first bit detecting means and a reference clock, a frequency detecting part for detecting a frequency difference between the bit data and the reference clock, an adding part for summing the phase differences and the frequency differences, a filtering part for filtering a value provided from the adding part such that the value falls within a certain range, a clock generator for generating the reference clock of a certain frequency and phase based on an output of the filtering part, and an interpolating part for interpolating the radio frequency signal in response to the reference clock generated in the clock generator.

14. A method of detecting a digital bit in an optical disc reproducing apparatus that has an optical pick-up for picking up a radio frequency signal from information pits formed in the optical disc, the method comprising:

detecting bit data from the radio frequency signal;

selectively generating a predetermined compensating value according to an arrangement state of the bit data detected; and adjusting an amplitude of the radio frequency signal within a section thereof according to the predetermined compensating value generated.

15. A method as claimed in claim 14, wherein the detecting the bit data from the radio frequency signal includes making an adaptive interpolation of the radio frequency signal according to a transmission rate of the bit data detected.

16. A method as claimed in claim 14, wherein the compensating the bit data includes:

partially compensating the radio frequency signal according to an arrangement state of the bit data detected, and detecting bit data from the radio frequency signal compensated.

17. A method as claim in claim 14, wherein the compensating value generating includes:

generating the certain compensating value, switching the certain compensating value generated, and controlling the switching according to the arrangement state of the bit data detected.

18. A method as claimed in claim 14, wherein the controlling the switching includes:

counting a number of successive repetitions of the bit data detected, and comparing the number of successive repetitions of the bit data counted to a preset reference number and controlling the switching means according to a result of the comparison.

19. A method as claim in claim 18, wherein the controlling the switching is performed according to a result of the comparison if the number is determined to correspond to a run length to shorter than 2T.

20. A method as claimed in claim 18, wherein the predetermined compensating value may be either positive or negative.

21. A method as claimed in claim 14, further comprising:

selectively providing either one of the positive or negative compensating values generated according to a logical value of the bit data detected.

22. A method as claimed in claim 14, wherein the amplitude is adjusted by:

delaying the radio frequency signal within a certain section thereof generated in the optical pick-up, and adding the compensating value to the radio frequency signal.

23. A method as claimed in claim 22, wherein the radio frequency signal is delayed as much as necessary for five bit data duration.

24. A method for detecting a digital bit in an optical disc reproducing apparatus having an optical pick-up for picking up a radio frequency signal from information pits formed in the optical disc, the method comprising:

detecting bit data from the radio frequency signal; and compensating the bit data according to an arrangement state of the bit data detected, wherein the detecting the bit data includes making an adaptive interpolation of the radio frequency signal according to a transmission rate of the bit data detected, and wherein the interpolating includes:

detecting a phase difference between the bit data detected and a reference clock, detecting a frequency difference between the bit data and the reference clock, summing the phase differences and the frequency differences, filtering a sum of the phase differences and the frequency differences such that the filtering result falls within a certain range, generating the reference clock of a certain frequency and phase based on a filtering result, and interpolating the radio frequency signal in response to the reference clock generated.

25. A method as claimed in claim 24, wherein detecting the bit data further includes:

detecting an asymmetry from the radio frequency signal, and compensating the radio frequency signal according to a value of the detected asymmetry.

26. A method as claimed in claim 25, wherein detecting the bit further includes:

detecting an asymmetry from the radio frequency signal, and subjecting a value of the detected asymmetry to subtraction from, or addition to, the radio frequency signal.

\* \* \* \* \*